(12) United States Patent
Trantham (10) Patent No.: US 11,684,154 B2
(45) Date of Patent: Jun. 27, 2023

(54) SHADE PILLOW (71) Applicant: Anthony Raymond Trantham, Grayson, GA (US)

(72) Inventor: Anthony Raymond Trantham, Grayson, GA (US)

(*) Notice: Subject to any disclaimer, the term of this patent is extended or adjusted under 35 U.S.C. 154(b) by 754 days.

(21) Appl. No.: 16/578,402

(22) Filed: Sep. 23, 2019

(65) Prior Publication Data
US 2021/0085074 A1    Mar. 25, 2021

(51) Int. Cl.
*A47B 23/06* (2006.01)
*A47G 9/10* (2006.01)
*G06F 1/16* (2006.01)
*A47B 23/04* (2006.01)

(52) U.S. Cl.
CPC ............ *A47B 23/06* (2013.01); *A47B 23/044* (2013.01); *A47G 9/1045* (2013.01); *G06F 1/1603* (2013.01); *A47G 2009/1018* (2013.01)

(58) Field of Classification Search
CPC ..... A47B 23/06; A47B 23/044; G06F 1/1603; A47G 9/1045; A47G 2009/1018
USPC .................................................. 359/611, 612
See application file for complete search history.

(56) References Cited

U.S. PATENT DOCUMENTS

| | | | | |
|---|---|---|---|---|
| 1,746,833 A | * | 2/1930 | Hermansen | B63C 9/1255 5/418 |
| 1,921,984 A | * | 8/1933 | Moore | A47G 9/1045 5/636 |
| 2,932,833 A | * | 4/1960 | Wambach | A47G 9/1045 5/418 |
| 3,651,847 A | * | 3/1972 | Casamassima | A47G 9/1045 383/14 |
| 3,716,877 A | * | 2/1973 | Glintz | A45D 20/44 5/639 |
| 4,063,318 A | * | 12/1977 | Nicholson | A47G 9/1045 5/418 |
| 4,100,633 A | * | 7/1978 | Pintos | A45B 23/00 5/639 |
| 4,121,303 A | * | 10/1978 | Reece | G01R 13/202 2/205 |
| 4,425,675 A | * | 1/1984 | Victor | A47G 9/1045 5/636 |
| 4,459,714 A | * | 7/1984 | Lin | A47C 27/081 24/DIG. 42 |
| 4,639,958 A | * | 2/1987 | Lerner | A45B 23/00 5/418 |

(Continued)

FOREIGN PATENT DOCUMENTS

| | | | | | |
|---|---|---|---|---|---|
| GB | | 707953 A | * | 4/1954 | ......... A47G 9/1045 |
| GB | | 2455719 A | * | 6/2009 | ............ A63F 13/02 |
| KR | 20090123118 A | | * | 12/2009 | ......... A47G 9/1045 |

*Primary Examiner* — Michael Safavi (57) ABSTRACT

A eShade Pillow is described. The eShade Pillow includes a pillow having a volume at least partially filled with cushioning materials. The eShade Pillow also includes at least four sidewalls collapsible and stowable adjacent with a surface of the pillow. When deployed the at least four sidewalls are supported by a rigid flap engaging at least a portion of at least two of the sidewalls, the at least four sidewalls forming at least two apertures, a viewing aperture and a device aperture. The device aperture is configured to receive a display device within the device aperture for viewing of the display through the viewing aperture.

18 Claims, 5 Drawing Sheets

(56) References Cited

U.S. PATENT DOCUMENTS

| | | | | |
|---|---|---|---|---|
| 4,796,734 A * | 1/1989 | Distasio | A45C 9/00 | |
| | | | 5/418 | |
| 5,299,337 A * | 4/1994 | Venza | A47C 7/66 | |
| | | | 5/418 | |
| 5,515,564 A * | 5/1996 | Lyons | A47C 1/14 | |
| | | | 5/639 | |
| 6,390,260 B1 * | 5/2002 | Roegner | A47D 15/003 | |
| | | | 5/655 | |
| 6,394,615 B1 * | 5/2002 | Hill | G06F 1/1601 | |
| | | | 359/601 | |
| 6,668,407 B1 * | 12/2003 | Reitzel | A47C 7/66 | |
| | | | 5/639 | |
| 6,711,769 B1 * | 3/2004 | Jane-Prats | A45B 23/00 | |
| | | | 5/639 | |
| 7,591,032 B2 * | 9/2009 | Harrison | E04H 15/38 | |
| | | | 5/8 | |
| 7,657,954 B1 * | 2/2010 | Bunkers | A47C 7/383 | |
| | | | 5/639 | |
| 8,990,980 B1 * | 3/2015 | Hindley | A47C 7/383 | |
| | | | 5/639 | |
| 11,332,954 B1 * | 5/2022 | Chase | E04H 15/58 | |
| 2004/0206645 A1 * | 10/2004 | Rouhanis | A45C 11/24 | |
| | | | 206/320 | |
| 2007/0075975 A1 * | 4/2007 | Aguilera | G06F 1/1603 | |
| | | | 345/169 | |
| 2013/0125312 A1 * | 5/2013 | Harooni | A47C 7/383 | |
| | | | 5/639 | |
| 2013/0229715 A1 * | 9/2013 | Allen | G02B 27/0018 | |
| | | | 359/613 | |
| 2013/0254999 A1 * | 10/2013 | Foch | A47G 9/1045 | |
| | | | 5/639 | |
| 2014/0300969 A1 * | 10/2014 | Schmidt | G02B 27/00 | |
| | | | 359/609 | |
| 2015/0308145 A1 * | 10/2015 | Rouhanis | A45C 7/0077 | |
| | | | 135/143 | |

* cited by examiner

SHADE PILLOW

BACKGROUND

Portable electronic viewing devices such as the mobile tablets, laptops, mobile gaming devices and mobile phones are often used during transportation or in public places for entertainment purposes or viewing information that becomes displayed on a display panel. When the display is used outdoors or in bright sunlight, the ambient light causes glare on the display. To avoid such glare from direct sunlight the user may adjust the brightness/contrast on the display or reposition the display to counter the effect of the glare or increased light. However, such adjustments often do not prevent glare in direct sunlight and therefore make viewing the display difficult. Moreover, increasing brightness of the display is an added burden on the battery of the device, thus shortening the viewing time of the display device or electronic viewing device. Moreover, sometimes the information displayed on the portable electronic viewing device may be confidential to the user or the user's business or organization and should not be viewed or seen by other persons in the vicinity of the display device. This need for privacy and security is often required especially on buses, airplanes, trains, subways, restaurants and the like where it is relatively easy for person(s) nearby to view the information displayed for the user.

Various shades and the like are available for shading a display from ambient light, however when travelling or on the go, it may not be desirable to carry such a shade as an extraneous piece of equipment. Also, when using a notebook computer or a tablet, it is often desirable to have a comfortable surface to support the device during use.

Therefore, it is readily apparent that there is a recognizable unmet need for a lap shade and method of shielding glare that functions to prevent glare on a viewing device and ambient light around the viewers eyes when used outdoors or near a window and, thereby, enhances the users viewing experience and privacy that is integrated into a support device that has additional uses for a person travelling or on the go.

SUMMARY

Briefly described, is an exemplary embodiment, the present apparatus and method overcomes the above-mentioned disadvantages and meets the recognized need for a eShade Pillow and method of shielding glare comprising, in general, a collapsible structure or shell having one or more encompassing sidewalls configured to form a conduit on which is mounted a bottom wall, the conduit further includes an upper first aperture positioned opposite the back wall and configured to conform to a user's face and at least one lower second aperture positioned in the one or more encompassing sidewalls and configured to enable insertion of the viewable device within the conduit and alternatively configured for hand insertion therein, to operate the viewable device positioned within the collapsible structure. The eShade Pillow, when folded or in the stowed position is integrated into a pillow which also doubles as a device supporting work surface. In use, a display device or electronic viewing device may be inserted through the at least one lower second aperture with the display facing the upper first aperture to create a viewing conduit or direct shaded path between a viewer's eye and a display, which blocks bright sunlight or the ambient light that causes glare on the display. The display device or electronic viewing device may include an access opening to provide hand access to operate the display device or electronic viewing device.

According to its major aspects and broadly stated, the present apparatus meets the recognized need for a eShade Pillow to block light that causes glare on a display while being integrated with a pillow and work surface, comprising a structure having one or more sidewalls configured to form a conduit, the structure further includes a first aperture positioned on a first end of the structure configured to conform to the users face, and at least one second aperture positioned on a second and opposite end of the structure configured to encompass the display.

In a further exemplary embodiment, a eShade Pillow to block light that causes glare on a display comprises a supporting pillow and work surface coupled with a structure having one or more sidewalls configured to form a conduit. The structure further includes a first aperture positioned on a first end of said structure configured to conform to the user's face, a bottom positioned on a second and opposite end of said structure configured to form a base to the structure and configured as a pillow surface, and at least one second aperture positioned on a second and opposite end of said structure configured to enable insertion of the display within the structure.

In a further exemplary embodiment of a method of shielding glare comprising the steps of providing a pillow coupled with a fold-out structure having one or more sidewalls configured to form a conduit, the fold-out structure further includes a first aperture positioned on a first end of said structure configured to conform to the users face, a bottom positioned on a second and opposite end of said structure configured to form a base to the structure and forming a surface of the pillow, and at least one second aperture positioned on a second and opposite end of said structure configured to enable insertion of the display within said structure, positioning said structure on a viewer's lap, inserting the device through at least one second aperture, positioning the viewer's face against said first aperture, and viewing the device through said structure without glare.

Accordingly, a feature of the eShade Pillow and method of shielding glare is its ability to provide a device for reducing glare originating from light sources external to the display.

Another feature of the eShade Pillow and method of shielding glare is its ability to provide a portable pillow with a collapsible ambient light shield apparatus which, when the display is used outdoors, near a window or in bright ambient light (e.g., sunlight) and placed about a portable electronic viewing device, where the user can view the contents of the display without necessarily moving the display to avoid the interference by ambient light and without necessarily adjusting the brightness/contrast dials on the display.

Yet another feature of the eShade Pillow and method of shielding glare is its ability to move from a collapsed condition where it can be used as a pillow or it can be used as a work surface to a deployed condition for use as a glare shield.

Yet another feature of the eShade Pillow and method of shielding glare is its ability to accommodate a variety of portable electronic devices, such as size, shape, and position of hand operation elements. Yet another feature of the eShade Pillow and method of shielding glare is its ability to provide a stylish eShade Pillow to personalize the appearance of the apparatus for display, marketing and sales purposes. Also, to provide a stylish pillow when the shade is folded and stowed.

Yet another feature of the eShade Pillow and method of shielding glare is its ability to provide a low cost, storable and portable pillow.

Yet another feature of the eShade Pillow and method of shielding glare is its ability to provide an antiglare apparatus formed of a relatively durable material, such as ethylene vinyl acetate (EVA), polyvinyl chloride (PVC), polypropylene (cross linked), or polyurethane.

Yet another feature of the eShade Pillow and method of shielding glare is its ability to provide an antiglare apparatus formed of a disposable material, such as recycled paper.

Yet another feature of the eShade Pillow and method of shielding glare is its ability to be folded or flattened compactly into a pillow and lap work surface that can be easily carried for travelling therewith.

Yet another feature of the eShade Pillow and method of shielding glare is its ability to provide a direct shaded path from a viewer's eyes to the viewable device.

Yet another feature of the eShade Pillow and method of shielding glare is its ability to provide a direct shaded path from a viewer's eyes to the viewable device, and not being restrictive to the viewer's movement nor partially encompassing the viewer under a hot environment.

Yet another feature of the eShade Pillow and method of shielding glare is its ability to ensure that persons other than the user cannot view the display, thereby preserving the confidentiality of sensitive information.

Yet another feature of the eShade Pillow and method of shielding glare is its ability to increase visual clarity in brightly lit conditions of a viewing device.

Yet another feature of the eShade Pillow and method of shielding glare is its ability to glare and the effects of ambient light when viewing a device.

In addition to the foregoing, other system aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

It is to be noted that the drawings presented are intended solely for the purpose of illustration and that they are, therefore, neither desired nor intended to limit the disclosure to any or all of the exact details of construction shown, except insofar as they may be deemed essential to the claimed invention. The use of the same symbols in different drawings typically indicates similar or identical items unless context dictates otherwise.

DETAILED DESCRIPTION

In describing the exemplary embodiments of the present disclosure, as illustrated in FIGS. 1-8 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein.

Figure 1:
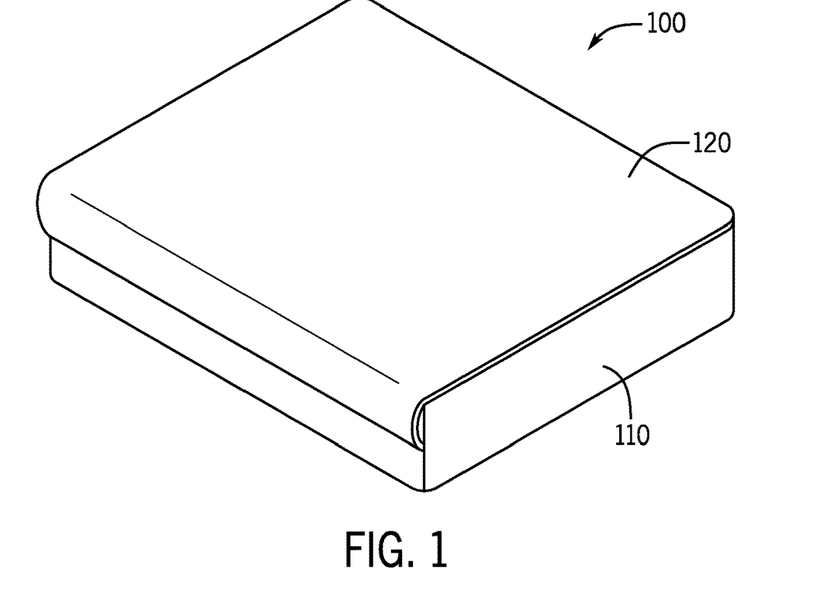
FIG. 1 is an exemplary perspective view of the eShade Pillow in a folded collapsed state.

The examples set forth herein are nonlimiting examples, and are merely examples among other possible examples. Referring now to FIG. 1 by way of example, and not limitation, there is illustrated an example embodiment foldable collapsible structure, conduit or shell, such as eShade Pillow 100. Preferably, eShade Pillow 100 includes a pillow portion 110 with a foldable cover portion 120. Pillow portion 110 may be any of a variety of shapes including substantially rectangular boxed shaped, rounded, oval, etc. Pillow portion 110 may be filled with foam material, feathers, down, or any of a variety of soft cushioning materials without departing from the scope of the invention. In the depicted configuration, eShade Pillow 100 may be used as a pillow. Especially when in the orientation shown, the eShade Pillow 100 may be set on a lap and cover portion 120 may be used as a work surface for placing a laptop or tablet or the like.

EShade Pillow 100 is preferably formed, molded or configured from a combination of suitable material, such as but not limited to expanded polypropylene, polyethylene, polystyrene, polyurethane, neoprene, nylon or alternative resin: plastic, paper, cardboard, canvas, rubber, fiber, foam filled material, fiber reinforced, synthetic rubber, natural rubber, fabric, wood, metal, aluminum, alloy, stainless steel, shape memory metal as a frame with a covering or material, or any flexible sheet or planar material or the like and any manufacturing method, capable of providing structure to eShade Pillow 100. Preferably, the material includes other suitable characteristics, such as light blocking, flexibility, strength, durability, water-resistance, breathability, cleanability, light weight, pliability, wear ability, chemical inertness, oxidation resistance, safety, smoothness, ease of workability, longevity, or other beneficial characteristic understood by one skilled in the art.

Pillow portion 110 and cover portion 120 may include a rich-textured or luxurious fabric sheet or surface layer such as cotton, linen, velvet, flock, faux leather (Vienna™), faux suede, silk, burlap, indicia, trademark or the like, or a stain resistant material, such as a soft rubber or polymer, an adhesive, or the like covering an exterior surface of eShade Pillow 100 or marked with an indicia or trademark to provide eShade Pillow 100.

Figure 2:
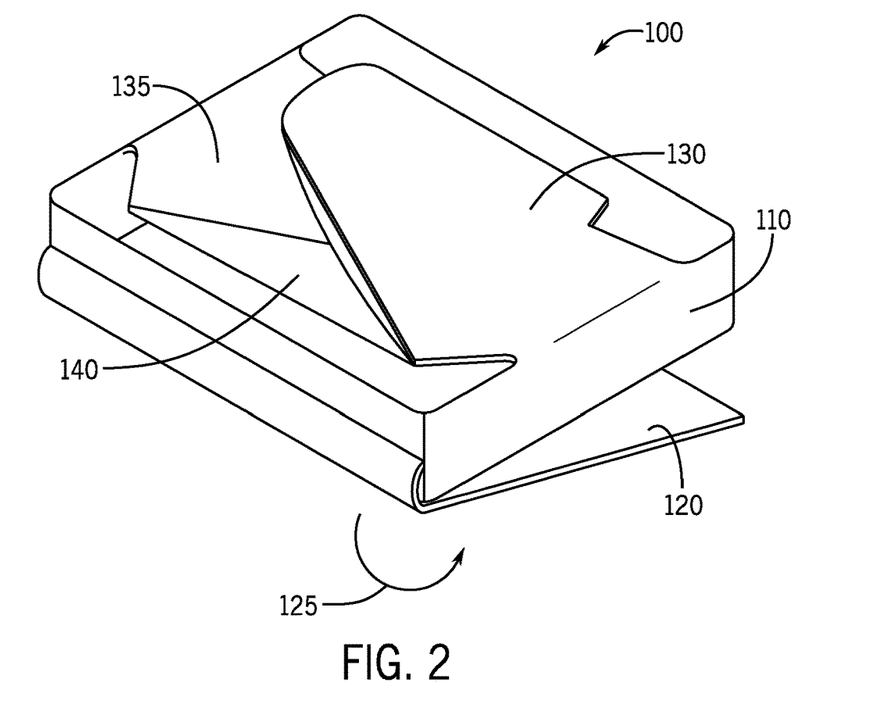
FIG. 2 is an exemplary perspective view of the eShade Pillow of FIG. 1 with the cover being unfolded.
Figure 3:
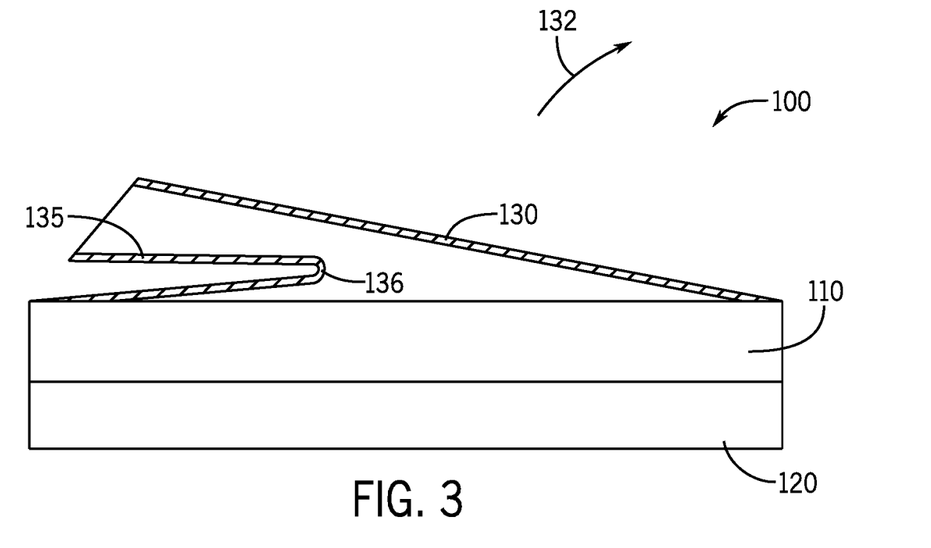
FIG. 3 is an exemplary rear view of the eShade Pillow as it is initially being unfolded.
Figure 4:
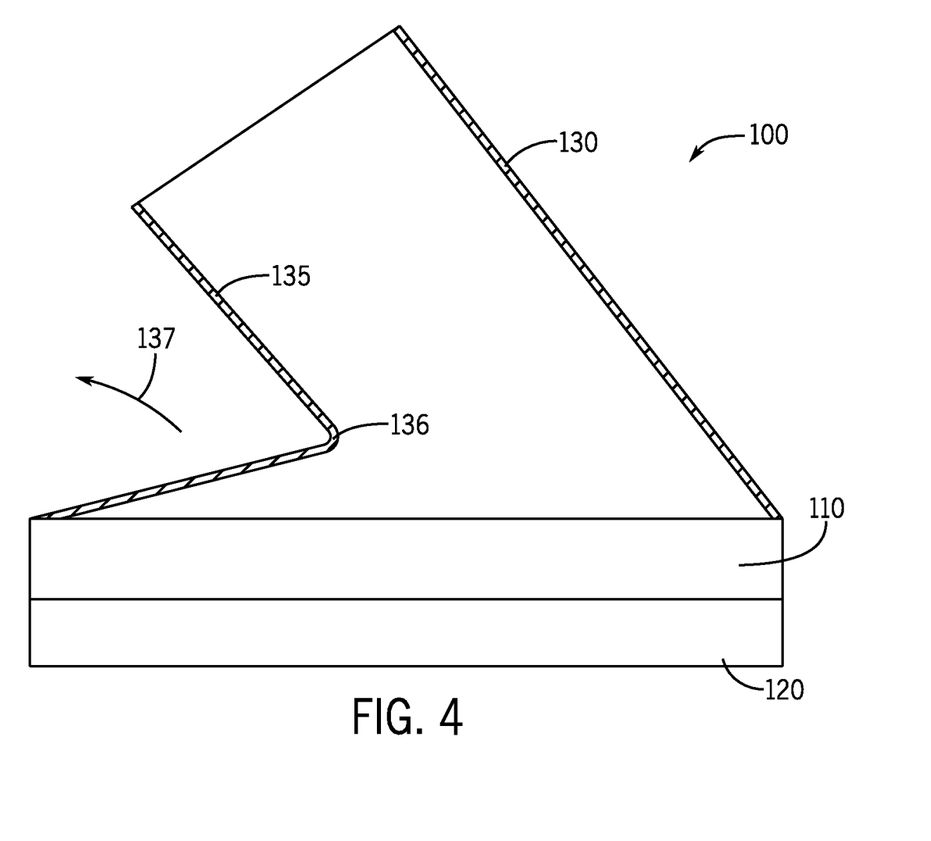
FIG. 4 is an exemplary rear view as in FIG. 3 but being further unfolded.

Referring now to FIG. 2, as cover portion 120 is flipped in direction 125 around to the bottom side of pillow portion 110, two folded sides 130 and 135 are exposed in a collapsed, folded, or stowed state. Referring to FIG. 3, upon further unfolding, side 130 is rotated in direction 132 and side 135 begins to unfold, side 135 having a secondary fold 136. As depicted in FIG. 4, as the sides 130 and 135 are further unfolded, side 135 unfolds in a direction 137 as depicted.

Figure 5:
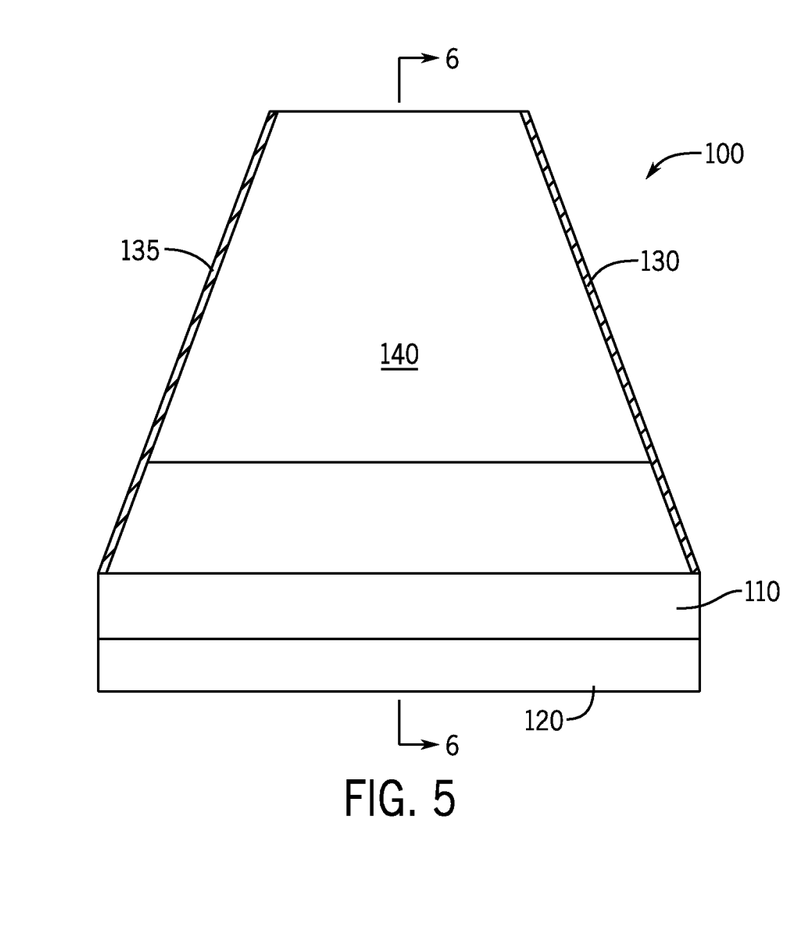
FIG. 5. is an exemplary rear view of the eShade Pillow with the shade all the way deployed.
Figure 6:
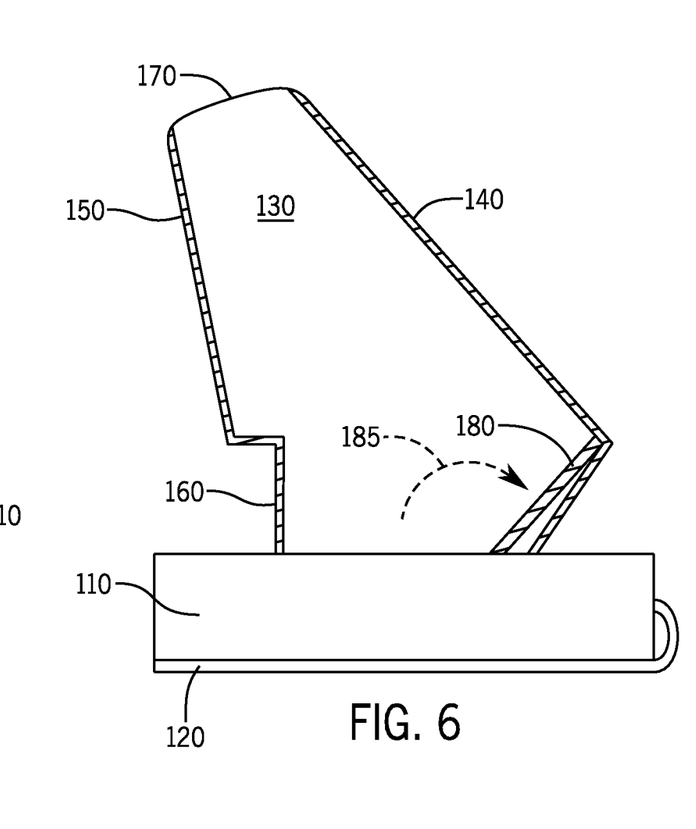
FIG. 6 is an exemplary cross-sectional side view of the eShade Pillow taken along the line 6-6 in FIG. 5.

Referring now to FIG. 5, the shade portion of eShade Pillow 100 is fully extended comprised of sides 130 and 135 and flexible material or fabric 140 extending between sides 130 and 135. Referring to FIG. 6 as a view taken along line 6-6 of FIG. 5, the cavity formed by side 130 and flexible materials 140 and 150 which both extend between sides 130 and 135 are depicted. A device aperture 160 into the cavity is located above the pillow 110 surface and a viewing aperture 170 is formed by sides 130, and 135 and flexible materials 140 and 150. Viewing aperture 170 allows viewing into the cavity and the ability to view a device inserted into device aperture 160. A rigid support 185 is flipped in the direction 185 to support the shade and maintain flexible materials 140 and 150 from collapsing.

Figure 7:
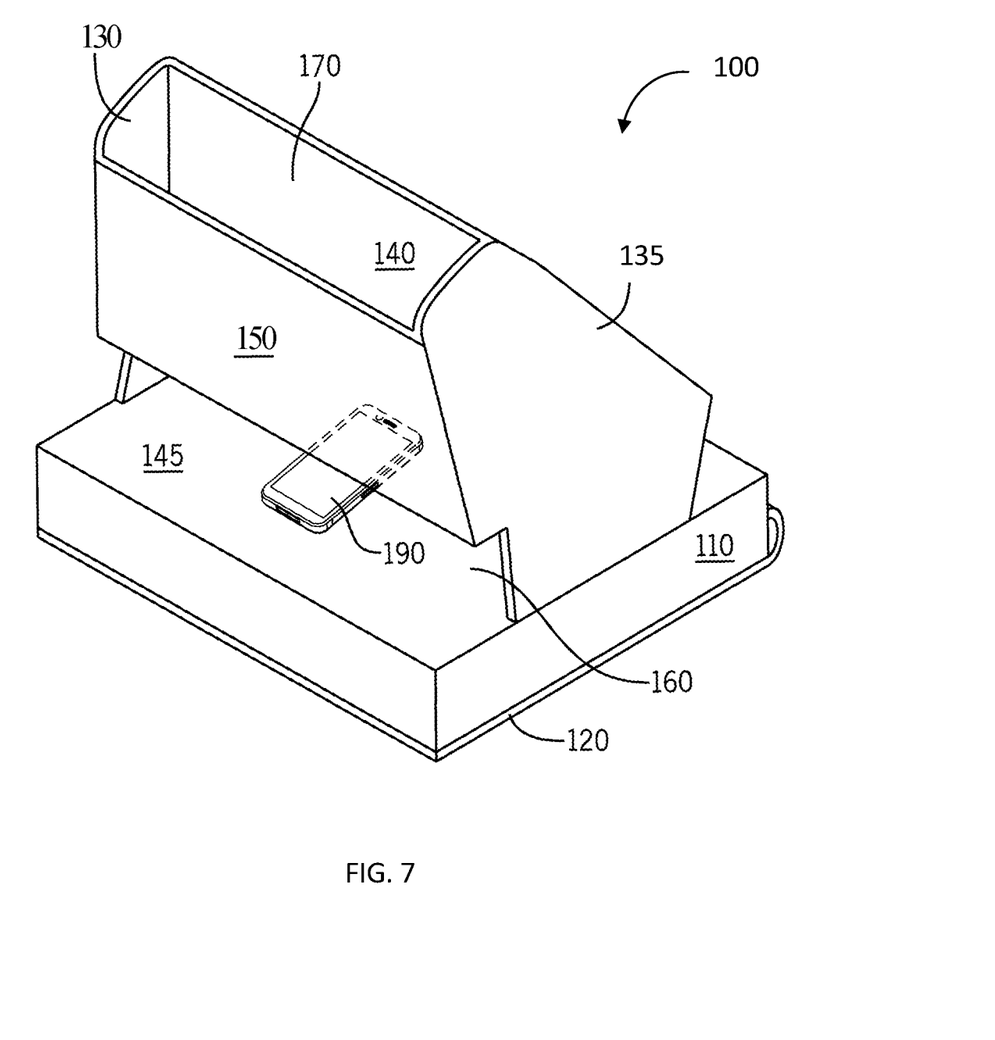
FIG. 7 is an exemplary perspective view of the eShade Pillow with a device inserted for viewing.

Referring now to FIG. 7, a device 190 is supported on a surface 195 and inserted into device aperture 160. A user of device 190 may also place their hands within device aperture 160 for operation of device 190 while viewing the display through aperture 170. Providing shielding from light and glare by flexible materials 140 and 150 coupled with sides 130 and 140, allows a device 190 user to better view the display screen in the presence of bright ambient light or alternatively helps to maintain privacy of information shown on the display screen of device 190.

Figure 8:
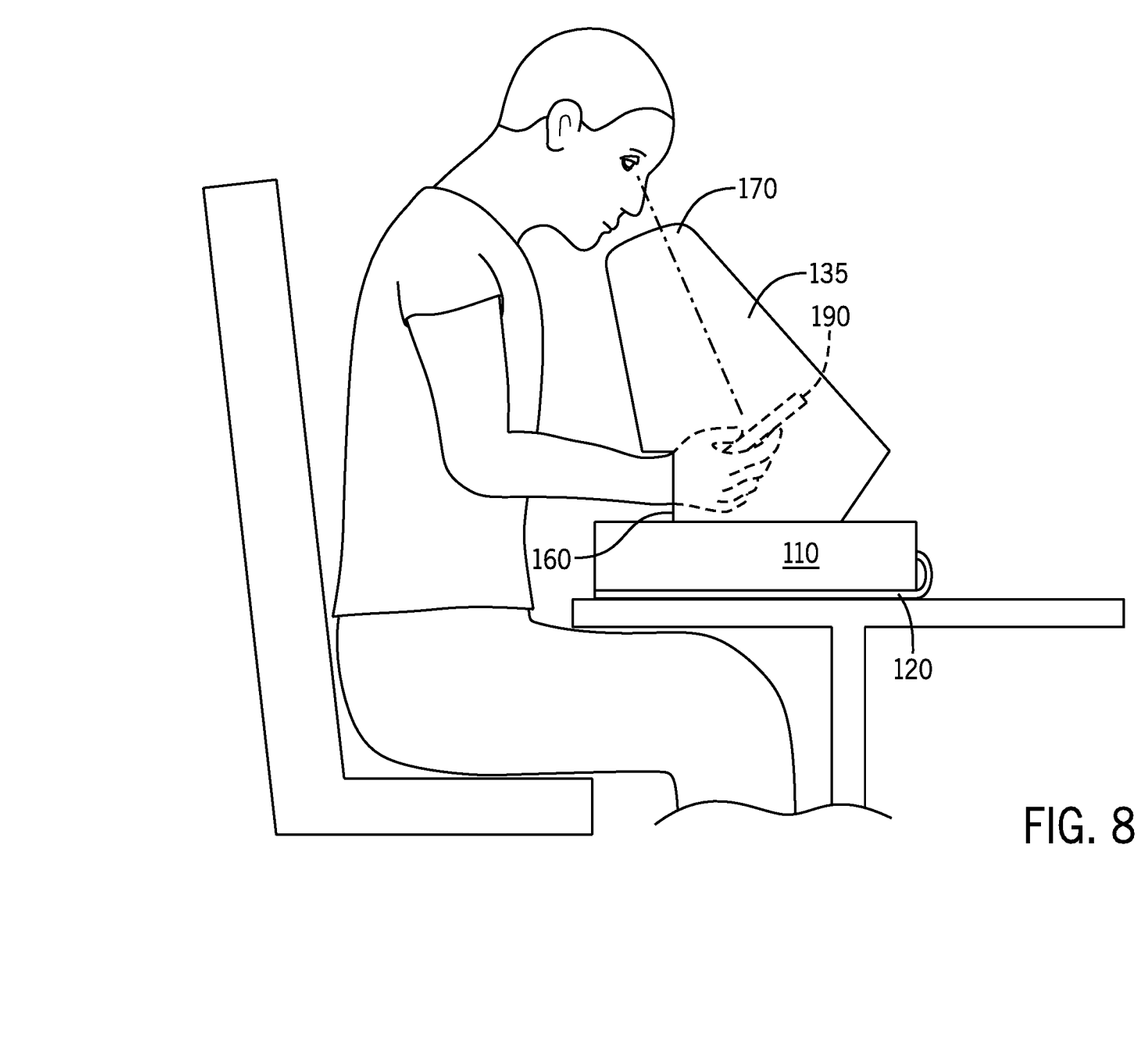
FIG. 8 is an exemplary perspective view of the eShade Pillow with a device being used by a user.

Similarly referring to FIG. 8, a user is depicted operating a device 190 within the viewing cavity. The user is viewing the display screen of device 190 through viewing aperture 170 as they manipulate device 190 while reaching through aperture 160. As depicted in FIG. 1, eShade Pillow 100 may be carried in the collapsed folded state so that it is relatively compact when not in use. Further, however eShade Pillow 100 acts as a pillow for one's head, while sitting or lying down, for sitting on, or to support one's back. EShade Pillow 100 may be used as any ordinary pillow is used. EShade Pillow 100 may be filled with any of a variety of pliable soft materials including but not limited to foams, feathers, down, cloth, gas or fluid filled elements and gas or fluid filled bladders.

Preferably, sides 130 and 135 may be configured to be flat planar connected surfaces configured to be collapsible, flexible and foldable along fold line 136 to move the eShade Pillow from a collapsed condition for storage and transportation and use as a pillow or lap work surface, to an unfolded position in a deployed condition for use as a glare shield. Preferably, eShade Pillow 100 includes one or more cutouts, or holes, such as device aperture 160 and viewing aperture 170 configured to enable viewing access and display or device insertion and/or hand access into eShade Pillow 100. Preferably, viewing aperture 170 may include one or more edges, configured as 'goggle like', straight, concave or rounded, sectioned, to touch, nearly touch, fit or accommodate a viewer's face and create a seal to block ambient light from entering therein, but other shapes for viewing aperture 170 are contemplated herein. Moreover, it is contemplated herein that viewing aperture 170 may include a cushion or soft exterior, such as rubber or felt to create a seal around the viewer's face to block ambient light from entering eShade Pillow 100.

Preferably, device aperture 160 is configured to enable device insertion and/or hand access to operate the device within eShade Pillow 100. A device or viewing device herein includes portable electronic devices or displays such as but not limited to mobile tablets, laptops, mobile gaming devices and mobile phones or a book or magazine or other viewable object used during transportation or in public places for entertainment or productivity purposes. Preferably, viewing aperture 170 is configured as a slot or one or more apertures to create a seal and block ambient light around the device but other shapes for viewing aperture 170 are contemplated herein.

It is contemplated herein that the viewing device is inserted through viewing aperture 170 of eShade Pillow 100 and, in use. the viewer looks down through eShade Pillow 100 to view a clear glare free device.

In an exemplary embodiment, eShade Pillow 100 has approximate preferred dimensions length×width×height, where length L is approximately as great as the distance across a seated person's (child, teen or an adult) thighs or lap, and the width W of sides 130 and 135 is approximately as great as the length of a seated person's (child, teen or an adult) thighs or lap, and the height H of sides 130$m$ and 135 are approximately as great as the distance between a person's (child, teen or an adult) lap and approximately the person's collar bone. It is recognized herein that eShade Pillow 100 may include dimensions other than those set forth above for example the length×width may be configured to accommodate the dimensions of a particular device.

When sides 130 and 135 are collapsed for the viewing portal, eShade Pillow 100 may be used as a lap pillow, head pillow, back pillow or the like. Alternatively, eShade Pillow 100 may be placed on a lap and used as a lap work surface, such as for writing or for supporting an electronic device, such as but not limited to a laptop computer or the like. In accordance with an exemplary embodiment, when using eShade Pillow 100 to view a lighted electronic display device, the walls of eShade Pillow 100 prevent light from exiting to the surrounding area especially in a dark room, a dark airplane, or a space where the light may be disturbing to another such as in a space where someone is sleeping. When eShade Pillow 100 is used in an outdoor environment, eShade Pillow prevents glare on the display screen of the electronic device being used by blocking incoming light at 360 degrees around the device. In accordance with an exemplary embodiment, the walls of eShade Pillow 100 may be deployed by spring-like members, shape memory materials, or the like without departing from the scope of the invention.

The foregoing description and drawings comprise illustrative embodiments of the present invention. Having thus described exemplary embodiments, it should be noted by those ordinarily skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains, having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein but is limited only by the following claims.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A shade Pillow to block light that causes glare on a display, comprising:
   a pillow structure having a volume at least partially filled with cushioning materials;
   a structure having one or more sidewalls foldably coupled to the pillow structure and configured to form a conduit, the structure further includes
      a first aperture positioned on a first end of said structure configured to conform to a user's face, and
      at least one second aperture positioned on a second and opposite end of the structure configured to encompass the display; and
   a cover portion configured to cover the one or more sidewalls when in a folded state.

2. The shade Pillow of claim 1, wherein the one or more sidewalls further comprises a fold line configured to expand and contract said one or more sidewalls.

3. The shade Pillow of claim 1, wherein the first aperture further comprises at least one edge configured to create a seal to block ambient light.

4. The shade Pillow of claim 1, wherein the first aperture further comprises at least one edge the at least one edge including a felt to create an additional seal to block ambient light.

5. The shade Pillow of claim 3, wherein said at least one edge is configured to be goggle shaped.

6. The shade Pillow of claim 1, wherein a bottom of the conduit is formed of a bottom side of the pillow structure.

7. The shade Pillow of claim 6, wherein the at least one second aperture is configured to enable insertion of the display therein the structure.

8. The shade Pillow of claim 6, wherein the at least one second aperture is configured for hand insertion therein, to operate the device.

9. The shade Pillow of claim 1, wherein the one or more sidewalls further comprises a third aperture configured to enable access therein of the device's power cord.

10. The shade Pillow of claim 2, wherein said fold line is configured to contract the one or more sidewalls for storage of the structure atop one side of the pillow.

11. The shade Pillow to block light that causes glare on a display comprising:
    a pillow having a volume at least partially filled with cushioning materials;
    a structure having one or more sidewalls configured to form a conduit in an extended state and the one or more sidewalls configured and to lie substantially flat against the pillow in a collapsed state, the structure in the extended state further includes
    a first aperture positioned on a first end of the structure configured to conform to the user's face;

a bottom positioned on a second and opposite end of the structure configured to form a base to the structure, the bottom being an integrated surface of the pillow;

at least one second aperture positioned on a second and opposite end of said structure configured to enable insertion of the display therein said structure; and a cover portion coupled to the pillow and configured to cover the one or more sidewalls when the one or more sidewalls are in a folded state.

12. The shade Pillow of claim 11, wherein the one or more sidewalls further comprises a fold line configured to expand and contract said one or more sidewalls.

13. The shade Pillow of claim 11, wherein the first aperture further comprises at least one edge configured to create a seal to block ambient light.

14. The shade Pillow of claim 11, wherein the one or more sidewalls further comprises a fold line configured to contract the one or more sidewalls for storage of the structure as an integrated portion of the pillow.

15. The shade Pillow, comprising:

a pillow having a volume at least partially filled with cushioning materials;

at least four sidewalls collapsible and stowable adjacent with a surface of the pillow, when deployed the at least four sidewalls being supported by a rigid flap engaging at least a portion of at least two of the sidewalls, the at least four sidewalls forming at least two apertures, a viewing aperture and a device aperture; and a cover portion configured to cover the at least four sidewalls when in a collapsed state, wherein the device aperture is configured to receive a display device within the device aperture for viewing of the display through the viewing aperture.

16. The shade Pillow of claim 15, wherein the cover portion forms a work surface when covering the at least four sidewalls, the work surface configured to support a mobile electronic device.

17. The shade Pillow of claim 15, wherein the cushioning materials comprise at least one of foam or feathers.

18. The shade Pillow of claim 15, wherein the cushioning materials comprise one or more gas filled bladders.

* * * * *